United States Patent
Dieges et al.

(10) Patent No.: US 11,459,178 B2
(45) Date of Patent: Oct. 4, 2022

(54) SORTING INSTALLATION, LATCHING APPARATUS AND TRANSPORT UNIT

(71) Applicant: Siemens Aktiengesellschaft, Munich (DE)

(72) Inventors: Andreas Dieges, Ergoldsbach (DE); Herbert Pommer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/210,167

(22) Filed: Mar. 23, 2021

(65) Prior Publication Data
US 2021/0300685 A1    Sep. 30, 2021

(30) Foreign Application Priority Data
Mar. 24, 2020    (EP) .................................... 20165211

(51) Int. Cl.
| | |
|---|---|
| B65G 47/42 | (2006.01) |
| B65G 47/74 | (2006.01) |
| H02K 21/14 | (2006.01) |
| B65G 17/34 | (2006.01) |
| H02K 7/10 | (2006.01) |

(52) U.S. Cl.
CPC ........... *B65G 17/345* (2013.01); *B65G 47/74* (2013.01); *H02K 7/1004* (2013.01); *H02K 21/14* (2013.01)

(58) Field of Classification Search
CPC ......... B65G 47/42; B65G 47/74; H01K 21/14
USPC ................ 198/348, 370.01, 370.06
See application file for complete search history.

(56) References Cited

U.S. PATENT DOCUMENTS

| | | | | |
|---|---|---|---|---|
| 4,413,721 | A * | 11/1983 | Bollier .................. | B65G 47/96 198/802 |
| 5,690,209 | A * | 11/1997 | Kofoed ................ | B65G 17/345 198/370.06 |
| 6,938,750 | B2 | 9/2005 | Miller et al. | |
| 8,210,343 | B2 * | 7/2012 | Lykkegaard ......... | H02K 41/031 198/805 |
| 9,065,310 | B2 * | 6/2015 | Ragan ...................... | H02K 1/14 |
| 9,108,807 | B1 * | 8/2015 | Ogle, II ................. | B65G 47/82 |
| 9,154,016 | B2 * | 10/2015 | Chierego ................. | B60K 7/00 |
| 9,233,803 | B2 * | 1/2016 | Pilarz ................... | B65G 17/345 |

(Continued)

FOREIGN PATENT DOCUMENTS

| | | |
|---|---|---|
| CN | 108 910 392 A | 11/2018 |
| JP | H02 36514 A | 3/1990 |
| JP | 2011/207599 A | 10/2011 |

OTHER PUBLICATIONS

US 2021/0148732 A1, Kadoguchi et al., May 20 (Year: 2021).*

Primary Examiner — Douglas A Hess
(74) Attorney, Agent, or Firm — Henry M. Feiereisen LLC (57) ABSTRACT

A sorting installation, in particular for transporting and/or sorting items to be conveyed, includes a transport path, a stator arranged adjacent to the transport path and a transport unit configured to move on the transport path in a movement direction. The transport unit includes a conveyor element for loading and/or unloading an item, and a conveyor rotor for driving the conveyor element. The conveyor rotor includes a permanent magnet and interacts electromagnetically with the stator for rotation about an axis of rotation. A latching apparatus applies a detent torque on the conveyor rotor, when the conveyor rotor interacts electromagnetically with the latching apparatus.

20 Claims, 5 Drawing Sheets

(56) References Cited

U.S. PATENT DOCUMENTS

| | | | |
|---|---|---|---|
| 9,371,193 B2* | 6/2016 | Ragan | B65G 39/08 |
| 9,428,338 B2* | 8/2016 | Ragan | B65G 13/06 |
| 10,377,582 B2* | 8/2019 | Lykkegaard | B65G 47/96 |
| 10,994,941 B1* | 5/2021 | Dwivedi | B65G 35/06 |
| 2019/0375302 A1 | 12/2019 | Fukuda et al. | |

* cited by examiner

SORTING INSTALLATION, LATCHING APPARATUS AND TRANSPORT UNIT

CROSS-REFERENCES TO RELATED APPLICATIONS

This application claims the priority of European Patent Application, Serial No. 20165211.2, filed Mar. 24, 2020, pursuant to 35 U.S.C. 119(a)-(d), the disclosure of which is incorporated herein by reference in its entirety as if fully set forth herein.

BACKGROUND OF THE INVENTION

The invention relates to a sorting installation, in particular for transporting and/or sorting items to be conveyed, to a latching apparatus, and to a transport unit.

The following discussion of related art is provided to assist the reader in understanding the advantages of the invention, and is not to be construed as an admission that this related art is prior art to this invention.

In sorting installations, for example in parcel and baggage sorting installations, carriers are used to transport items to be conveyed. The carriers are loaded with the items at a loading station, and transport these items on a transport path to an unloading station. Each carrier has a conveyor belt (also referred to as cross belt), which can move the items transversely, e.g. at right angle, in relation to a movement direction of the carrier. The items are generally fed to the carrier via a feeder conveyor belt or a feeder channel or a feeder path at a loading station. The conveyor belt receives the items and positions them, e.g. centrally, on the carrier. The items can be transferred from the carrier via a transfer conveyor belt or a transfer channel or a transfer path at an unloading station.

Until now, the conveyor belt has been driven by a geared motor on the carrier. However, the use of a geared motor is accompanied with a number of disadvantages. Problems such as friction losses, gear backlash, movement inaccuracies or wear lead to a poor degree of efficiency. Moreover, geared motors require intensive maintenance.

It would therefore be desirable and advantageous to obviate prior art shortcomings.

SUMMARY OF THE INVENTION

According to one aspect of the present invention, a sorting installation, in particular for transporting and/or sorting items to be conveyed, includes a transport path, a stator arranged adjacent to the transport path, a transport unit configured to move on the transport path in a movement direction, the transport unit including a conveyor element for loading and/or unloading an item, and a conveyor rotor for driving the conveyor element, the conveyor rotor including a permanent magnet and interacting electromagnetically with the stator for rotation about an axis of rotation, and a latching apparatus configured to apply a detent torque on the conveyor rotor, when the conveyor rotor interacts electromagnetically with the latching apparatus.

The transport unit can be a carrier and the conveyor dement can be a cross belt. Other configurations of the conveyor element are, of course, conceivable as well. The conveyor element can, for example, be embodied as a tilting element, in which items to be conveyed are loaded and/or unloaded by a tilting movement. A carrier as transport unit may include a plurality of conveyor elements, for example two or more cross belts, e.g. with different movement directions. Another configuration may also involve a carrier having a cross belt and a tilting element.

The stator may advantageously be arranged at a loading station and/or at an unloading station. An arrangement at other sections of the transport path is, however, also conceivable. The stator can be energized so as to cause the conveyor rotor and thus of the conveyor element to rotate so that the items can be received or transferred.

The stator can be an individual stator or a stator grouping having a plurality of stators. In the case of a stator grouping, the stators are advantageously energized consecutively in a movement direction of the transport unit. The stator may advantageously be embodied half-open, e.g. as a segment stator.

The conveyor rotor and the stator may jointly form a motor for directly driving the conveyor element. The transport unit advantageously has no stator associated with the conveyor rotor. The conveyor rotor and the stator may advantageously form a synchronous motor.

Further advantages of the invention are: The individual carriers—and thus the complete system—become simpler, more lightweight and cheaper, since a multiplicity of carriers share only a few stators.

The transport unit is, as described above, embodied to move on the transport path in a movement direction. This is advantageously achieved with a linear drive. Other drive types are, of course, also possible. A linear drive involves a drive system which produces a translational movement and enables a movement of machines or machine elements and/or installations or installation parts in a straight line or along another predetermined path. An example of a linear drive for moving the transport unit on the transport path involves a linear motor. A linear motor is an electrical drive machine. Unlike a rotating machine, a linear motor does not shift objects driven by it in a rotating movement but instead pushes them along a straight or curved path. The linear motor performs a translational movement.

According to another advantageous feature of the invention, the conveyor rotor can include a plurality of permanent magnets to apply the detent torque through electromagnetic interaction between the conveyor rotor and the latching apparatus having soft-magnetic material. This advantageously causes the rotor to assume a position in which permanent magnets and teeth of the latching apparatus lie opposite one another. What governs hereby is that the more teeth, the higher the detent torque.

According to another advantageous feature of the invention, the latching apparatus can include a winding system to generate and/or increase a holding torque, with the winding system being positioned in grooves of the latching apparatus between adjacent teeth. The holding torque represents an additional torque which is achieved by equipping the latching apparatus with permanent magnets and/or by energizing the winding system advantageously positioned in the grooves. As a result, the conveyor element, in particular the conveyor rotor, can advantageously be held or fixed, in particular when the transport unit traverses curves, ascending gradients and/or other inclines. In curves, ascending gradients and/or inclines, a centrifugal force and/or gravity acts on the conveyor element and/or on the items which are being transported. When these forces become greater than mechanical friction torques of the conveyor element and/or of the conveyor rotor (advantageously also including any mountings, gears, etc.), the risk of items falling off the transport unit is avoided by a sorting installation in accordance with the invention.

According to another advantageous feature of the invention, the latching apparatus can be arranged on a section of the transport path such that a centrifugal force and/or gravity cause the conveyor rotor to rotate in the absence of an electromagnetic interaction with the stator. Such a rotation is normally unwanted at these sections of the transport path, since there is a risk of items that can slip or fall off the transport unit.

According to another advantageous feature of the invention, the latching apparatus can have soft-magnetic material. Ferromagnetic materials are particularly suitable. The latching apparatus advantageously has iron and/or steel. It is moreover possible for the latching apparatus to have nickel and/or cobalt.

Nom According to another advantageous feature of the invention, the latching apparatus can be distanced from the conveyor rotor to define an air gap there between. Thus, when the transport unit passes a latching apparatus as it travels along the transport path, the conveyor rotor and the latching apparatus are distanced from one another only by the air gap. When the transport unit is located on a different section of the transport path, for example on a straight section without a latching apparatus, the distance between the latching apparatus and the conveyor rotor becomes significantly greater.

According to another advantageous feature of the invention, the latching apparatus can have a tooth configured to point in a direction of the air gap. The tooth can be advantageously embodied such as to run in the movement direction of the transport unit. In curves, for example, the tooth can be advantageously embodied in a curved shape or tangentially.

According to another advantageous feature of the invention, the latching apparatus can include a plurality of teeth, with a groove being defined between adjacent two of the teeth. Advantageously, the latching apparatus may include between 10 and 15 teeth. The number of teeth can be selected to achieve a required detent torque while still optimally using an available installation space. A maximum number is 2p teeth, wherein 2p is the number of rotor poles.

According to another advantageous feature of the invention, the latching apparatus can include a magnetically conductive yoke configured to connect the teeth. The yoke advantageously can contain ferromagnetic material, e.g. iron and/or steel. Alternatively, the yoke may provide a mechanical fastening and therefore may contain material with no or very low magnetic conductivity.

According to another advantageous feature of the invention, the latching apparatus can include a plurality of material layers. Advantageously, the latching apparatus can be a structure having material layers, wherein the material layers are joined together by screwing, riveting, welding, punch-packing, adhesive bonding and/or baking. The material layers may advantageously be metal sheets. Other types of material layers are however also conceivable. The latching apparatus may be configured to form a laminated core.

Alternatively, the latching apparatus can also be of solid construction, for example in the form of a solid part having iron and/or steel. Other, in particular ferromagnetic, materials are however also suitable. The latching apparatus may also be made of a sintered material or at least have sintered material. A material with good magnetic conductivity but with no or very low electrical conductivity may advantageously find use here.

According to another advantageous feature of the invention, the latching apparatus can be defined by an inside diameter which is greater than an outside diameter of the conveyor rotor. This is advantageous because it enables the transport unit together with the conveyor rotor to travel easily over the latching apparatus. An eccentric arrangement may also be possible.

As an alternative, an inside diameter of the latching apparatus may correspond to the outside diameter of the conveyor rotor. The air gap between the latching apparatus and the conveyor rotor may hereby advantageously be dimensioned such that the conveyor rotor and latching apparatus do not come into contact with one another during passage of the transport unit.

According to another advantageous feature of the invention, an inside diameter of the latching apparatus may be smaller than an outside diameter of the conveyor rotor. The air gap between the latching apparatus and the conveyor rotor can hereby advantageously be dimensioned such that the conveyor rotor and latching apparatus do not come into contact with one another during traversal of the transport unit.

According to another advantageous feature of the invention, the latching apparatus can be embodied as a segment which describes an angle in a range between 90° and 150', in particular between 110° and 130°. In particular a 110° to 130° segment is advantageous with regard to design properties, as in this way a sufficient number of teeth is possible and thus a good detent torque is achieved. Furthermore, the transport unit can travel easily over the latching apparatus. Other angles are, however, also possible.

According to another advantageous feature of the invention, the latching apparatus can have a tooth pitch which corresponds at least substantially to a pole pitch of the permanent magnets of the conveyor rotor. As a result, a permanent magnet lies advantageously opposite a tooth to thereby achieve a good detent torque. As an alternative, the latching apparatus can have a tooth pitch which corresponds at least substantially to a multiple or a divisor of the pole pitch of the permanent magnets of the conveyor rotor. Thus, a permanent magnet lies opposite two or three or four or more teeth, or a tooth lies opposite two or three or four or more permanent magnets.

As described above, the latching apparatus can have a winding system in order to generate and/or increase a holding torque, with the winding system advantageously positioned in the grooves. As a result, even very heavy items can be transported safely through curves. Furthermore, it is thus possible to overcome greater centrifugal forces generated for example by a faster movement, in other words faster travel, of the transport unit on the transport path. A positioning of the winding system in the grooves is particularly space-saving. It is, however, also conceivable for the winding system to be embodied between the teeth on the yoke, i.e. the winding system is wound between the teeth around the yoke.

According to another advantageous feature of the invention, the latching apparatus can include permanent magnets in order to generate and/or increase the holding torque. As a result, safe transport of heavy items is ensured.

According to another advantageous feature of the invention, the permanent magnets can be arranged in the grooves and/or on a side of the tooth pointing in the direction of the air gap between the latching apparatus and the conveyor rotor. Positioning of the permanent magnets in the grooves is particularly space-saving.

An arrangement of the permanent magnets in and/or on the yoke is however also conceivable. A combination of winding system and permanent magnets is also possible.

According to another advantageous feature of the invention, the sorting installation can include a plurality of transport units connected to form a transport chain. Advantageously, the transport units are connected in an articulated manner. A smooth running of the transport chain is hereby ensured. The articulated connection enables a good movement of the transport units in curves.

The transport units can however also be independent, i.e. not connected to a transport chain.

According to another aspect of the invention, a latching apparatus for a sorting installation is configured to apply a detent torque on a conveyor rotor of the sorting installation, when the conveyor rotor interacts electromagnetically with the latching apparatus, the latching apparatus having soft-magnetic material and including a tooth configured to point in a direction of an air gap between the latching apparatus and the conveyor rotor.

Advantageously, the latching apparatus can have a plurality of teeth, advantageously between 10 and 16, wherein the latching apparatus has a groove between two teeth. The teeth can be connected in an advantageous embodiment by way of a magnetically conductive yoke. The latching apparatus can include a plurality of material layers, e.g. metal sheets. The latching apparatus can be embodied half-open, in particular as a segment which describes an angle in a range between 90° and 150°, in particular between 110° and 130°.

According to another advantageous feature of the invention, provision is made for a winding system to generate and/or increase a holding torque, with the winding system being positioned in grooves of the latching apparatus between adjacent teeth, and permanent magnets generating and/or increasing the holding torque and arranged in the grooves and/or on a side of the tooth pointing in the direction of the air gap. Advantageously, each tooth can be surrounded by a coil. Insulating material can be arranged between tooth and coil. The permanent magnets can be arranged in the grooves and/or on a side of the tooth pointing in the direction of the air gap. A combination of winding system and permanent magnets is moreover conceivable as well.

According to still another aspect of the invention, a transport unit for a sorting installation includes a conveyor rotor and is configured in the absence of a stator interacting electromagnetically with the conveyor rotor. The conveyor rotor is advantageously permanent magnet-excited. A different excitation is however also conceivable.

The invention offers the advantage that, on account of the separation of stator and conveyor rotor, no complex energy transfer to a moving carrier is necessary. A latching apparatus according to the invention makes it possible to dispense with actuators on the carrier which need to be supplied with electrical and/or mechanical energy, such as for example an electrically or mechanically actuated brake for the conveyor belt. Using the magnetic detent torques enables the conveyor belt to be braked or held without electrical energy having to be supplied to the carrier for this purpose. Moreover, this also eliminates the need for a wear-prone mechanical contact to the carrier. A latching apparatus according to the invention is thus also cost-effective, as not every carrier requires its own braking apparatus.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
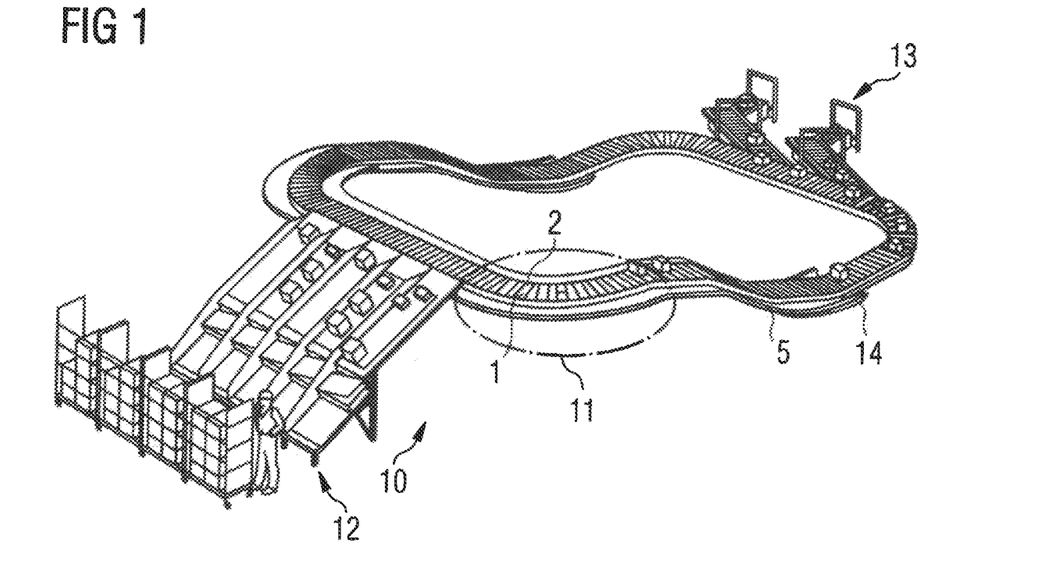
FIG. 1 is a schematic perspective view of a sorting installation with a loading station and an unloading station in accordance with the invention.

Turning now to the drawing, and in particular to FIG. 1, there is shown a schematic perspective view of a sorting installation, generally designated by reference numeral 10 and including a loading station 13 and an unloading station 12. The sorting installation 10 includes a plurality of transport units 1, referred to as carriers and joined together to form a transport chain. Advantageously, the individual transport units 1 of the transport chain are joined together in an articulated manner to form a closed transport chain. The transport units 1 are moved along a transport path 5 at speeds of 1 m/s to 3.5 m/s. Currently preferred is a speed of 2.5 m/s.

The transport units 1 are each loaded with an item 14, e.g. in the form of a parcel. For loading or unloading the item 14, the transport unit 1 has a conveyor element 2 in the form of a conveyor belt or cross belt.

As is apparent from FIG. 1, each transport unit 1 is loaded with an item 14 at the loading station 13, i.e. the transport unit 1 receives an item 14 at the loading station 13, and then transports the item 14 along the transport path 5 to the unloading station 12. The transport path 5 has at least one curve 11. When the transport unit 1 negotiates the curve 11, a centrifugal force acts on the transport unit 1 and on the item 14.

The conveyor element 2 includes a conveyor rotor 6 (not shown in FIG. 1) for driving the conveyor element 2. This is advantageous because, as a result, the transport unit 1 can receive and position the item 14 effectively, advantageously centrally.

Figure 2:
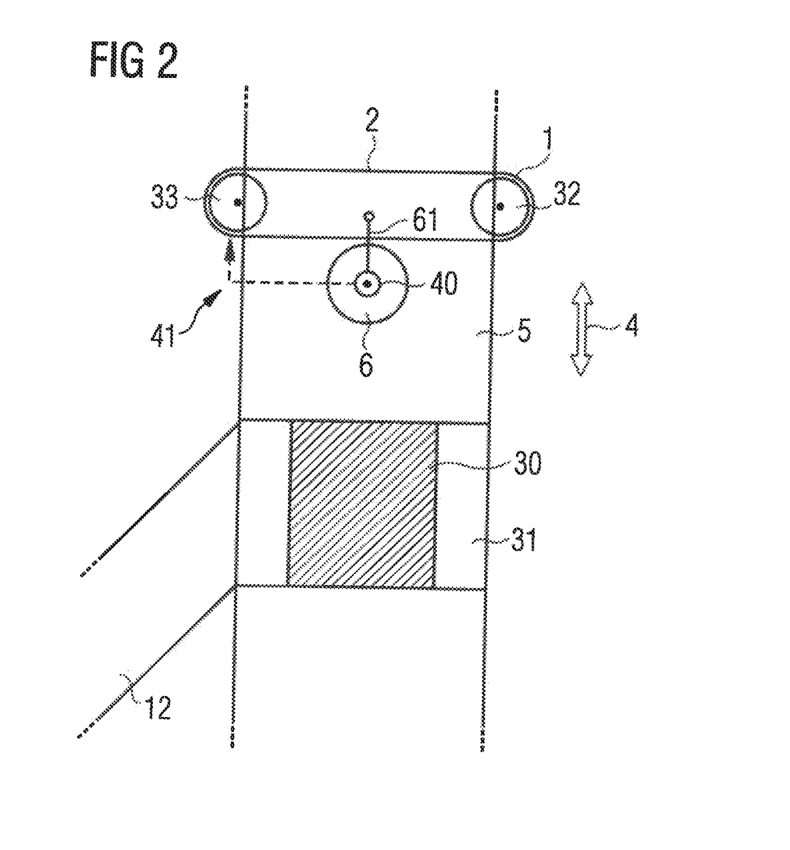
FIG. 2 is a schematic illustration of a section of a transport path which adjoins an unloading station.

FIG. 2 shows a schematic illustration of a section of the transport path 5 which adjoins the unloading station 12. The transport unit 1 travels on the transport path 5. This is achieved particularly effectively by means of a linear drive. Other drives for moving the transport unit 1 on the transport path 5 are, however, also possible.

A local stator 30 is arranged in an unloading region 31 at the unloading station 12. FIG. 2 further shows that the transport unit 1 has a conveyor element 2 as well as a drive roller 33 and a deflection roller 32. The drive roller 33 is driven by the conveyor rotor 6, which is fastened to the transport unit 1 by a mounting 61. A rotor shaft can be connected to the drive roller 33 for moving the drive roller 33. Further shown in FIG. 2 is a shaft 40 as well as a force transmission apparatus 41, which serves to transmit forces from the shaft 40 to the roller 33. Examples of a suitable force transmission apparatus 41 include a belt, a toothed belt, a chain, a toothed wheel or a cardan shaft. Other force transmission apparatuses are also conceivable.

The transport unit 1 moves in a movement direction, indicated by double arrow 4, on the transport path 5. When passing the unloading region 31, the conveyor rotor 6 and the stator 30 arranged in the unloading region 31 interact electromagnetically with one another. As a result, the conveyor rotor 6 can be rotated and the item 14 can be transferred into the unloading path of the unloading station 12. During this process, the conveyor rotor 6 drives the roller 33. The roller 32 serves only as a deflection roller. It is, however, also conceivable for both rollers 32, 33 to be driven by the conveyor rotor 6.

The stator 30 can be an individual stator. It is however also possible for several stators to be arranged one behind the other. An axial length of the stator 30 or an axial total length of the plurality of stators is advantageously greater than an axial length of the conveyor rotor 6.

Figure 3:
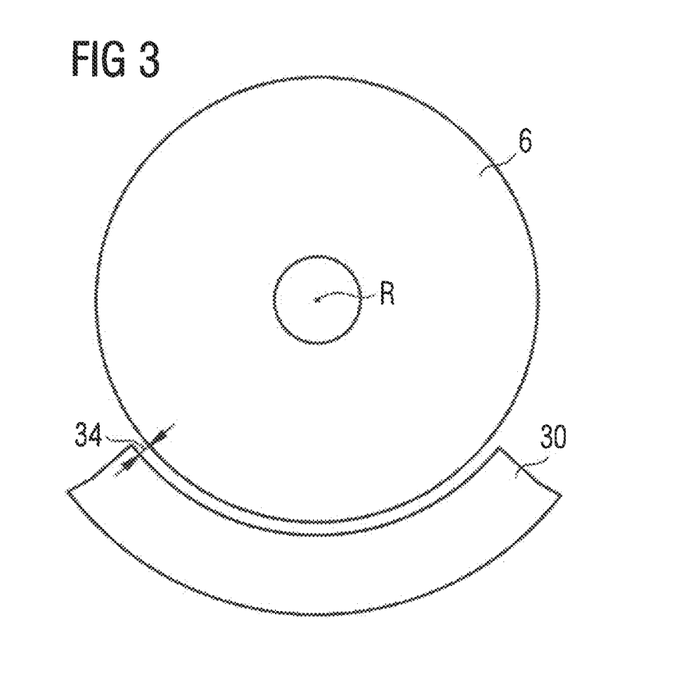
FIG. 3 is a schematic illustration of a conveyor rotor during as it passes a stator.

FIG. 3 shows the conveyor rotor 6 as it passes the stator 30. The conveyor rotor 6 and the stator 30 are distanced from one another by an air gap 34. The conveyor rotor 6 rotates about an axis of rotation R. The conveyor rotor 6 advantageously includes permanent magnets and the stator 30 is advantageously electrically excited. Several stators 30 of this kind can be arranged on the transport path 5. The stators 30 are embodied such that the conveyor rotor 6 rotates during passage of the loading station 13 such that an item 14 is moved by a feeder conveyor belt or feeder path from an edge of the transport unit 1 to a center of the transport unit 1. The stator 30, which is advantageously arranged in the unloading region 31, is energized such that the conveyor rotor 6 rotates during electromagnetic interaction to convey the item 14 from the center of the transport unit 1 to an edge of the transport unit 1 so that a transfer into a transfer path or onto a transfer conveyor belt is achieved.

The arrangement of conveyor rotor 6 and stator 30 can be part of a direct drive. This eliminates the need for a complex energy transfer compared with previously used geared motors.

Figure 4:
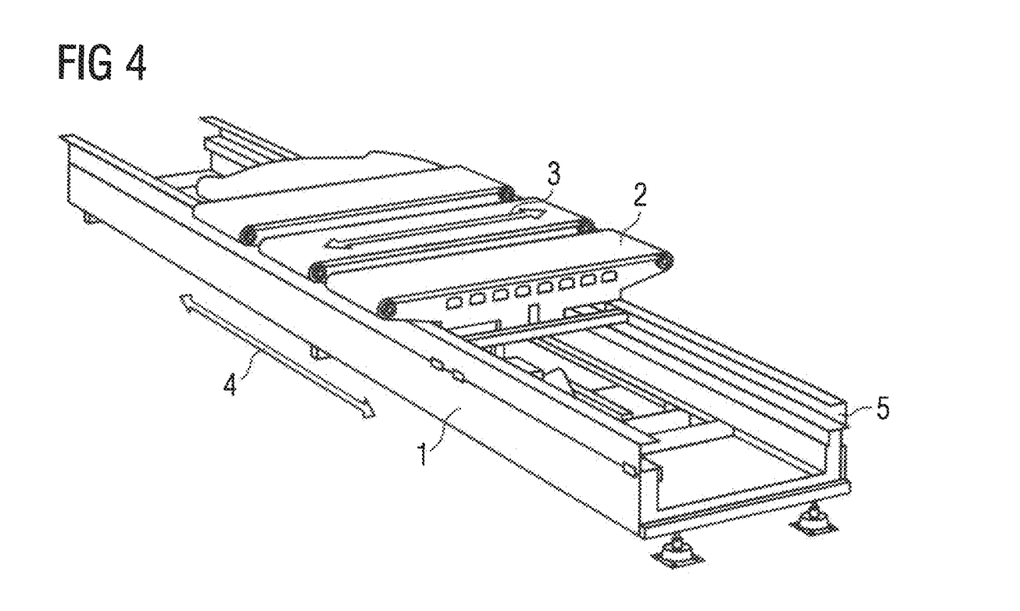
FIG. 4 is a perspective illustration of three transport units connected to one another.

FIG. 4 shows a perspective illustration of three transport units 1 which are connected to one another, advantageously joined to one another in an articulated manner. The transport units 1 can however also be independent.

The transport units 1 move in the movement direction 4 along the transport path 5 or on the transport path 5. This movement is advantageously achieved with a linear motor, although other drive types are also conceivable. FIG. 4 further shows the conveyor element 2, also referred to as cross belt, and the movement direction 3 of the conveyor element 2.

Figure 5:
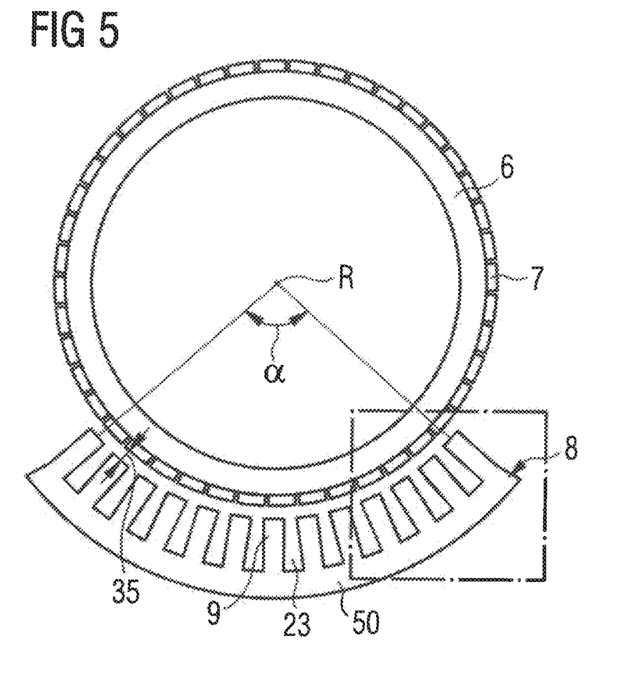
FIG. 5 is a schematic illustration of a first embodiment of a latching apparatus according to the invention.

FIG. 5 shows a schematic illustration of a first embodiment of a latching apparatus according to the invention, generally designated by reference numeral 8. The latching apparatus 8 has at least one tooth, advantageously a plurality of teeth 9, e.g. 10 and 15 teeth. The number of teeth 9 corresponds at most to the number of rotor poles. When configured with a maximum number of teeth 9, the latching apparatus 8 is however no longer embodied as a segment but instead as a full circle. Arranged between adjacent two teeth 9 is a groove 23. As can be seen from FIG. 5, the teeth are connected by way of a yoke 50. The yoke 50 advantageously has magnetically conductive material. FIG. 5 further shows the conveyor rotor 6, which is equipped with permanent magnets 7. The latching apparatus 8 is configured as a segment in FIG. 5. This segment describes an angle $\alpha$, wherein an angle apex of the angle $\alpha$ is arranged at the center point of the conveyor rotor 6, i.e. at the point where the axis of rotation R lies when viewed from the front.

The latching apparatus 8 preferably has a plurality of material layers, in particular in the form of metal sheets. The latching apparatus 8 can thus have the configuration of a laminated core. The latching apparatus 8 advantageously has soft-magnetic material. The latching apparatus 8 is distanced from the conveyor rotor 6 by an air gap 35.

Figure 6:
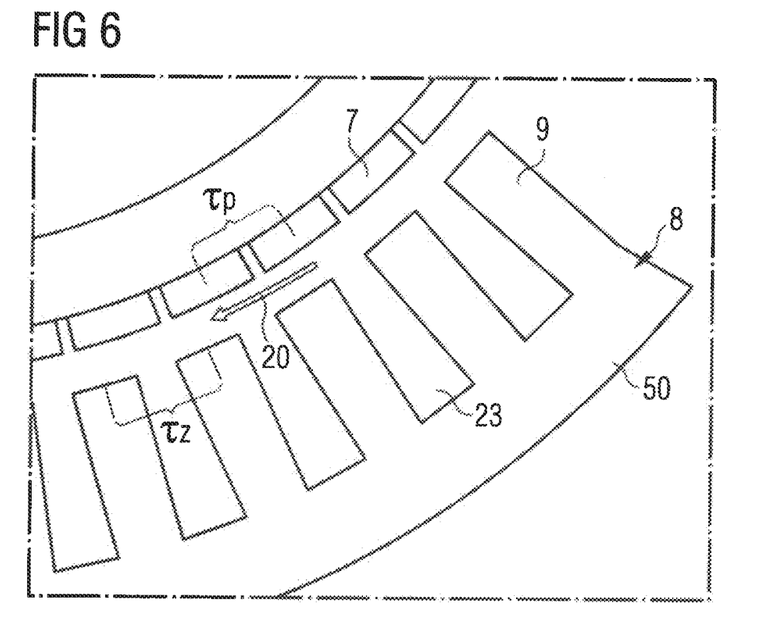
FIG. 6 is an enlarged detailed cutaway view of the latching apparatus of FIG. 5.

FIG. 6 shows an enlarged detailed cutaway view of the latching apparatus 8 of FIG. 5. The conveyor rotor 6 is defined by a pole pitch $T_p$ and the latching apparatus 8 is defined by a tooth pitch $T_z$, $T_p = T_z$. This is advantageous because, in the absence of electrical excitation, the conveyor rotor 6 moves into a position in which a permanent magnet 7 lies opposite a tooth 9, thus latching into place.

As can be seen from FIG. 6, a detent torque indicated by arrow 20 acts in the direction shown. Electromagnetic interactions take place between the permanent magnet 7 and soft-magnetic material in the latching apparatus 8 in order to achieve a position in which the tooth 9 and the permanent magnet 7 lie opposite one another.

The latching apparatus 8 shown in FIGS. 5 and 6 is advantageously arranged on sections of the transport path 5, which are embodied such that a centrifugal force and/or gravity effect an unwanted rotation of the conveyor rotor 6. In this case there is therefore no electromagnetic interaction with a stator which causes the conveyor rotor 6 to rotate, but instead a centrifugal force and/or gravity result in an unwanted movement of the conveyor element (here: conveyor belt) or of the conveyor rotor 6. This applies for example to curves or inclines of the transport belt. As long as the torques resulting from the centrifugal force and/or gravity are smaller than the detent torque, a movement of the conveyor rotor 6 is limited to no more than ¼ of the pole pitch in both rotation directions. A movement of the conveyor rotor 6 by no more than ½ of the pole pitch is possible as soon as the magnetic forces between rotor and latching apparatus 8 begin to take effect.

A number of teeth 9 in the latching apparatus 8 is linked directly to an extent of the detent torque, because the more teeth 9 there are in the latching apparatus 8, the greater the detent torque.

Figure 7:
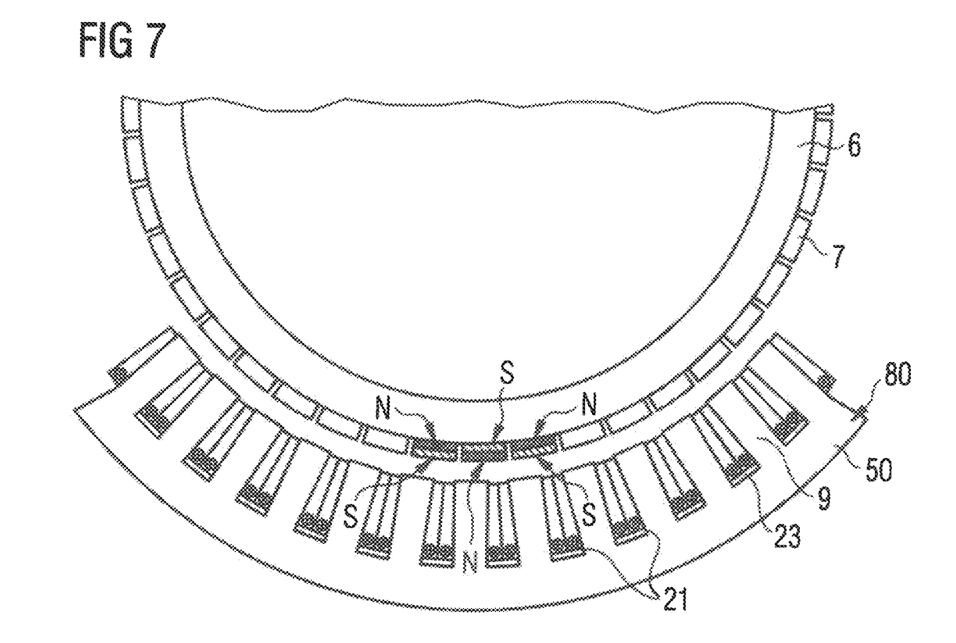
FIG. 7 is a schematic illustration of a portion of a second embodiment of a latching apparatus according to the invention.

FIG. 7 shows a schematic illustration of a portion of a second embodiment of a latching apparatus according to the invention, generally designated by reference numeral 80. Parts corresponding with those in FIG. 5 are denoted by identical reference numerals and not explained again. The description below will center on the differences between the embodiments. FIG. 7 shows the conveyor rotor 6, which is equipped with permanent magnets 7, and further shows by way of example the north pole and south pole on three permanent magnets 7. FIG. 7 also shows the latching apparatus 80 with teeth 9. A groove 23 is embodied between adjacent two teeth 9. A winding system 21 is positioned in the grooves 23.

The winding system 21 serves to increase a holding torque. When a detent torque is not sufficient to reliably prevent the conveyor element 2 or cross belt from making an unwanted movement, the holding torque can be increased by an additional winding system 21. To this end, as shown in FIG. 7, the latching apparatus 80 is equipped with additional winding systems 21. When current is applied, the holding torque can be increased beyond the detent torque.

When the polarity of a direct voltage is set as a function of a pole position of the conveyor rotor 6 to be held or braked, the conveyor rotor 6 moves by no more than ½ of the pole pitch as soon as a force begins to take effect between the conveyor rotor 6 and the latching apparatus 80. Provision of a sensor (not shown) is however required for this purpose. When the polarity of the direct voltage is fixed, a movement by one pole pitch is possible. As soon as the conveyor rotor 6 is held magnetically, a maximum deflection from a neutral position of 114 of the pole pitch is possible in both directions.

Figure 8:
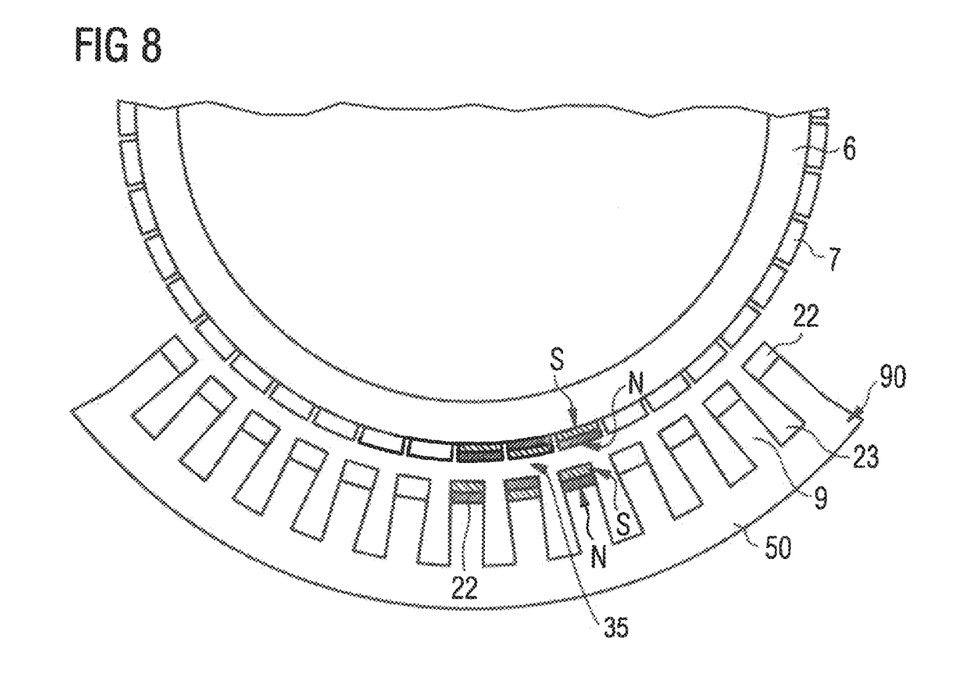
FIG. 8 is a schematic illustration of a portion of a third embodiment of a latching apparatus according to the invention.

FIG. 8 shows a schematic illustration of a portion of a third embodiment of a latching apparatus according to the invention, generally designated by reference numeral 90. Parts corresponding with those in FIGS. 5 and 7 are denoted by identical reference numerals and not explained again. The description below will center on the differences between the embodiments.

The latching apparatus 90 includes permanent magnets for increasing the holding torque. The permanent magnets are arranged on a side of the tooth 9 pointing in the direction of the air gap 35. The permanent magnets are advantageously arranged such that a pole sequence on the latching apparatus 90 corresponds to the pole sequence of the conveyor rotor 6. As a result of the use of permanent magnets, the conveyor rotor 6 moves by no more than one pole pitch when the force begins to take effect. As soon as the conveyor rotor 6 is held magnetically, the maximum deflection from the neutral position is ¼ of the pole pitch in both directions.

Figure 9:
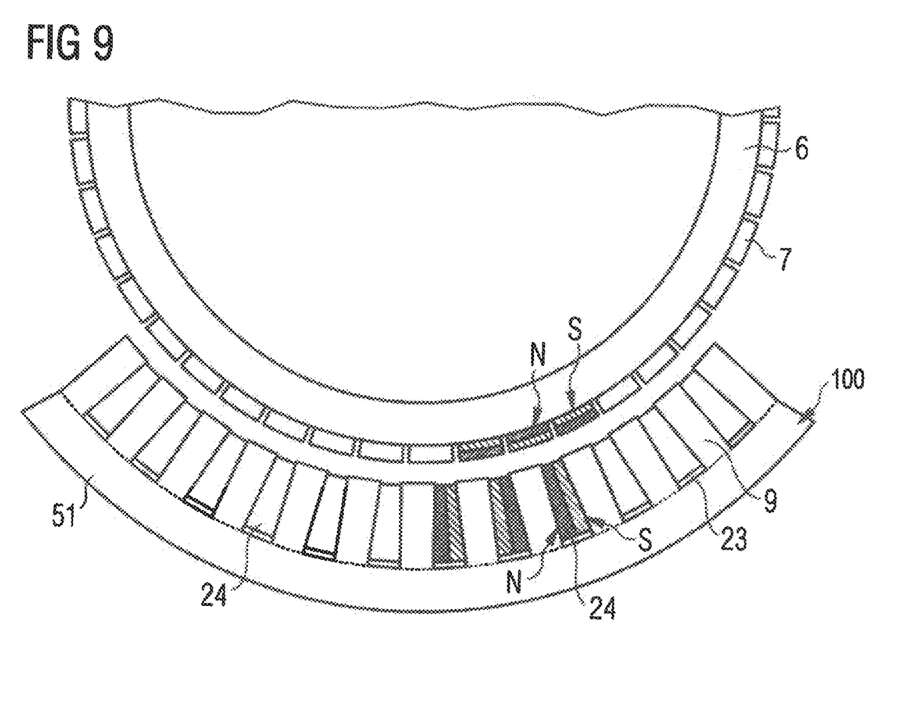
FIG. 9 is a schematic illustration of a portion of a fourth embodiment of a latching apparatus according to the invention.

FIG. 9 shows a schematic illustration of a portion of a fourth embodiment of a latching apparatus according to the invention, generally designated by reference numeral 100. The latching apparatus 100 has permanent magnets, which are arranged in the grooves 23. A yoke 51 serves only to mechanically fasten the teeth 9 and advantageously has no or very low magnetic conductivity. The yoke 51 contains plastic, for example.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A sorting installation, in particular for transporting and/or sorting items to be conveyed, said sorting installation comprising:

a transport path;
a stator arranged adjacent to the transport path;
a transport unit configured to move on the transport path in a movement direction, said transport unit comprising a conveyor element for loading and/or unloading an item, and a conveyor rotor for driving the conveyor element, said conveyor rotor including a permanent magnet and interacting electromagnetically with the stator for rotation about an axis of rotation; and
a latching apparatus configured to apply a detent torque on the conveyor rotor, when the conveyor rotor interacts electromagnetically with the latching apparatus.

2. The sorting installation of claim 1, wherein the conveyor rotor includes a plurality of said permanent magnet.

3. The sorting installation of claim 2, wherein the latching apparatus has a tooth pitch which corresponds at least substantially to a pole pitch of the permanent magnets of the conveyor rotor.

4. The sorting installation of claim 1, wherein the latching apparatus includes soft-magnetic material.

5. The sorting installation of claim 1, wherein the latching apparatus is distanced from the conveyor rotor to define an air gap there between.

6. The sorting installation of claim 5, wherein the latching apparatus includes a tooth configured to point in a direction of the air gap.

7. The sorting installation of claim 1, wherein the latching apparatus includes a plurality of teeth, with a groove being defined between adjacent two of the teeth.

8. The sorting installation of claim 7, wherein the latching apparatus includes between 10 and 15 of said teeth.

9. The sorting installation of claim 7, wherein the latching apparatus includes a magnetically conductive yoke configured to connect the teeth.

10. The sorting installation of claim 7, wherein the latching apparatus includes a winding system to generate and/or increase a holding torque, said winding system being positioned in grooves of the latching apparatus between adjacent teeth.

11. The sorting installation of claim 10, wherein the latching apparatus includes permanent magnets to generate and/or increase the holding torque.

12. The sorting installation of claim 11, wherein the permanent magnets are arranged in the grooves and/or on a side of the tooth pointing in a direction of an air gap between the latching apparatus and the conveyor rotor.

13. The sorting installation of claim 1, wherein the latching apparatus includes a plurality of material layers.

14. The sorting installation of claim 1, wherein the latching apparatus is defined by an inside diameter which is greater than an outside diameter of the conveyor rotor.

15. The sorting installation of claim 1, wherein the latching apparatus is embodied as a segment which describes an angle in a range between 90° and 150°, in particular between 110° and 130°.

16. The sorting installation of claim 1, wherein the latching apparatus is arranged on a section of the transport path such that at least one of a centrifugal force and gravity causes the conveyor rotor to rotate in the absence of an electromagnetic interaction with the stator.

17. The sorting installation of claim 1, further comprising a plurality of said transport unit connected, preferably connected in an articulated manner, to form a transport chain.

18. A latching apparatus for a sorting installation, said latching apparatus configured to apply a detent torque on a conveyor rotor of the sorting installation, when the conveyor rotor interacts electromagnetically with the latching apparatus, said latching apparatus comprising soft-magnetic material and including a tooth configured to point in a direction of an air gap between the latching apparatus and the conveyor rotor.

19. The latching apparatus of claim 18, further comprising:
   a winding system to generate and/or increase a holding torque, said winding system being positioned in grooves of the latching apparatus between adjacent teeth, and
   permanent magnets generating and/or increasing the holding torque and arranged in the grooves and/or on a side of the tooth pointing in the direction of the air gap.

20. A transport unit for a sorting installation, said transport unit comprising:
   a conveyor element for loading and/or unloading an item, and
   a conveyor rotor for driving the conveyor element, said conveyor rotor caused to rotate by a centrifugal force and/or gravity in the absence of an electromagnetic interaction of the conveyor rotor with a stator interacting electromagnetically.

* * * * *